United States Patent
Jerrard-Dunne

(10) Patent No.: US 11,228,575 B2
(45) Date of Patent: Jan. 18, 2022

(54) ENTERPRISE WORKSPACES

(71) Applicant: INTERNATIONAL BUSINESS MACHINES CORPORATION, Armonk, NY (US)

(72) Inventor: Stanley Kieran Jerrard-Dunne, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 16/523,197

(22) Filed: Jul. 26, 2019

(65) Prior Publication Data

US 2021/0029099 A1 Jan. 28, 2021

(51) Int. Cl.
*H04L 29/06* (2006.01)

(52) U.S. Cl.
CPC .......... *H04L 63/08* (2013.01); *H04L 63/0428* (2013.01); *H04L 63/1416* (2013.01)

(58) Field of Classification Search
CPC . H04L 63/08; H04L 63/1416; H04L 63/0428; H04L 63/0846; H04L 63/102
See application file for complete search history.

(56) References Cited

U.S. PATENT DOCUMENTS

| | | | |
|---|---|---|---|
| 6,324,683 B1 | 11/2001 | Fuh | |
| 8,271,418 B2 | 9/2012 | Allen | |
| 8,489,880 B1* | 7/2013 | Gagnon | H04L 9/3231 |
| | | | 713/176 |
| 8,841,987 B1* | 9/2014 | Stanfield | G07C 9/00857 |
| | | | 340/5.61 |
| 9,569,596 B2 | 2/2017 | Marcus | |
| 9,900,300 B1 | 2/2018 | Bennett | |
| 10,037,199 B2 | 7/2018 | Hung | |
| 10,073,679 B2 | 9/2018 | Straub | |
| 10,089,810 B1* | 10/2018 | Kaye | G07C 9/00309 |
| 10,242,232 B1 | 3/2019 | Hurry | |
| 2003/0189530 A1* | 10/2003 | Tsui | G08C 19/28 |
| | | | 345/48 |
| 2003/0193448 A1* | 10/2003 | Tsui | G08C 19/28 |
| | | | 345/48 |
| 2004/0117489 A1 | 6/2004 | Harmon | |
| 2005/0026601 A1* | 2/2005 | Chuey | G08C 17/02 |
| | | | 455/418 |
| 2005/0216397 A1 | 9/2005 | Micci-Barreca | |
| 2006/0098585 A1 | 5/2006 | Singh | |
| 2006/0107253 A1 | 5/2006 | Sano | |

(Continued)

FOREIGN PATENT DOCUMENTS

WO 2007039873 A2 4/2007

OTHER PUBLICATIONS

IBM, List of IBM Patents or Patent Applications Treated as Related, Appendix P, dated Jul. 27, 2019, 2 pages.

(Continued)

*Primary Examiner* — Aravind K Moorthy
(74) *Attorney, Agent, or Firm* — Kristofer L. Haggerty

(57) ABSTRACT

Concepts for defining authority for triggering an expression within an enterprise workspace from an external service outside the enterprise workspace are presented. Such concepts define a rolling key function configured to generate a rolling key. A secret is defined as a starting point for the rolling key function. The secret and the rolling key function are securely shared with the external service.

11 Claims, 5 Drawing Sheets

(56) References Cited

U.S. PATENT DOCUMENTS

| | | | |
|---|---|---|---|
| 2006/0206931 A1* | 9/2006 | Dillaway | H04L 63/0823 726/9 |
| 2007/0034686 A1* | 2/2007 | Davis | G06F 21/31 235/380 |
| 2007/0046424 A1* | 3/2007 | Davis | G07C 9/28 340/5.8 |
| 2007/0283396 A1* | 12/2007 | Kiujlaars | G08C 17/02 725/81 |
| 2008/0155095 A1 | 6/2008 | Yamaguchi | |
| 2008/0195740 A1 | 8/2008 | Lowell | |
| 2009/0128392 A1* | 5/2009 | Hardacker | H04N 21/4117 341/175 |
| 2010/0254537 A1* | 10/2010 | Buer | H04L 9/083 380/279 |
| 2011/0228936 A1* | 9/2011 | Silvermint | H04Q 9/04 380/255 |
| 2012/0150843 A1 | 6/2012 | Robert | |
| 2012/0151211 A1 | 6/2012 | Kreiner | |
| 2013/0346475 A1 | 12/2013 | Jasperson | |
| 2014/0096213 A1* | 4/2014 | Quan | G06F 21/606 726/7 |
| 2014/0136606 A1* | 5/2014 | Roundtree | H04L 67/306 709/203 |
| 2014/0218165 A1* | 8/2014 | Johnson | G07C 9/00857 340/5.25 |
| 2015/0012970 A1 | 1/2015 | Toksvig | |
| 2015/0058960 A1 | 2/2015 | Schmoyer | |
| 2015/0371467 A1* | 12/2015 | Wang | G07C 9/00309 340/5.26 |
| 2015/0379554 A1* | 12/2015 | Copeland | G06Q 30/0239 705/14.39 |
| 2016/0063224 A1* | 3/2016 | Raley | H04L 67/22 726/29 |
| 2016/0072777 A1* | 3/2016 | Jakoby | H04L 63/0428 713/153 |
| 2016/0094572 A1 | 3/2016 | Tyagi | |
| 2016/0112518 A1* | 4/2016 | Haleem | H04L 67/12 713/168 |
| 2016/0122419 A1 | 5/2016 | Bansal | |
| 2016/0145902 A1* | 5/2016 | Kalous | E05B 47/0001 700/275 |
| 2016/0274864 A1 | 9/2016 | Zomet | |
| 2016/0283740 A1* | 9/2016 | Roundtree | H04L 51/14 |
| 2016/0342504 A1 | 11/2016 | Beskrovny | |
| 2016/0381032 A1 | 12/2016 | Hashmi | |
| 2017/0019376 A1* | 1/2017 | Hars | H04L 63/068 |
| 2017/0093872 A1 | 3/2017 | Braksator | |
| 2017/0228182 A1* | 8/2017 | Novak | G06F 3/067 |
| 2017/0264612 A1* | 9/2017 | Kaushal | H04L 63/168 |
| 2017/0289128 A1* | 10/2017 | Kelley | H04L 63/083 |
| 2017/0364330 A1 | 12/2017 | Cheung | |
| 2018/0060890 A1 | 3/2018 | Noter | |
| 2018/0181608 A1 | 6/2018 | Wu | |
| 2018/0183835 A1* | 6/2018 | Bryant | G06F 16/2365 |
| 2018/0211462 A1* | 7/2018 | Wendling | G07C 9/00309 |
| 2018/0241548 A1* | 8/2018 | Dolev | H04L 9/0656 |
| 2018/0248896 A1 | 8/2018 | Challita | |
| 2018/0270064 A1* | 9/2018 | Gehrmann | H04L 9/3273 |
| 2018/0302269 A1* | 10/2018 | Sankaran | H04L 63/061 |
| 2019/0051067 A1* | 2/2019 | Witkowski | E05F 15/681 |
| 2019/0149540 A1 | 5/2019 | Shimazu | |
| 2019/0280943 A1 | 9/2019 | Kaw | |
| 2019/0303614 A1 | 10/2019 | Do | |
| 2019/0319954 A1 | 10/2019 | Chimakurthi | |
| 2019/0342702 A1* | 11/2019 | Shinar | H04W 4/40 |
| 2020/0045026 A1* | 2/2020 | Sagalovskiy | H04L 9/0825 |
| 2020/0137073 A1* | 4/2020 | Palan | G06F 16/2423 |
| 2020/0177577 A1* | 6/2020 | Jerrard-Dunne | H04L 67/02 |
| 2020/0177598 A1 | 6/2020 | Storr | |
| 2020/0184957 A1 | 6/2020 | Asumu | |
| 2020/0244673 A1 | 7/2020 | Stockdale | |
| 2021/0029098 A1 | 1/2021 | Jerrard-Dunne | |
| 2021/0029099 A1 | 1/2021 | Jerrard-Dunne | |
| 2021/0029214 A1 | 1/2021 | Jerrard-Dunne | |
| 2021/0067532 A1 | 3/2021 | Bruno | |

OTHER PUBLICATIONS

Pending U.S. Appl. No. 16/523,169, filed Jul. 26, 2019, entitled: "Enterprise Workspaces".

Pending U.S. Appl. No. 16/523,152, filed Jul. 26, 2019, entitled: "Enterprise Workspaces".

* cited by examiner

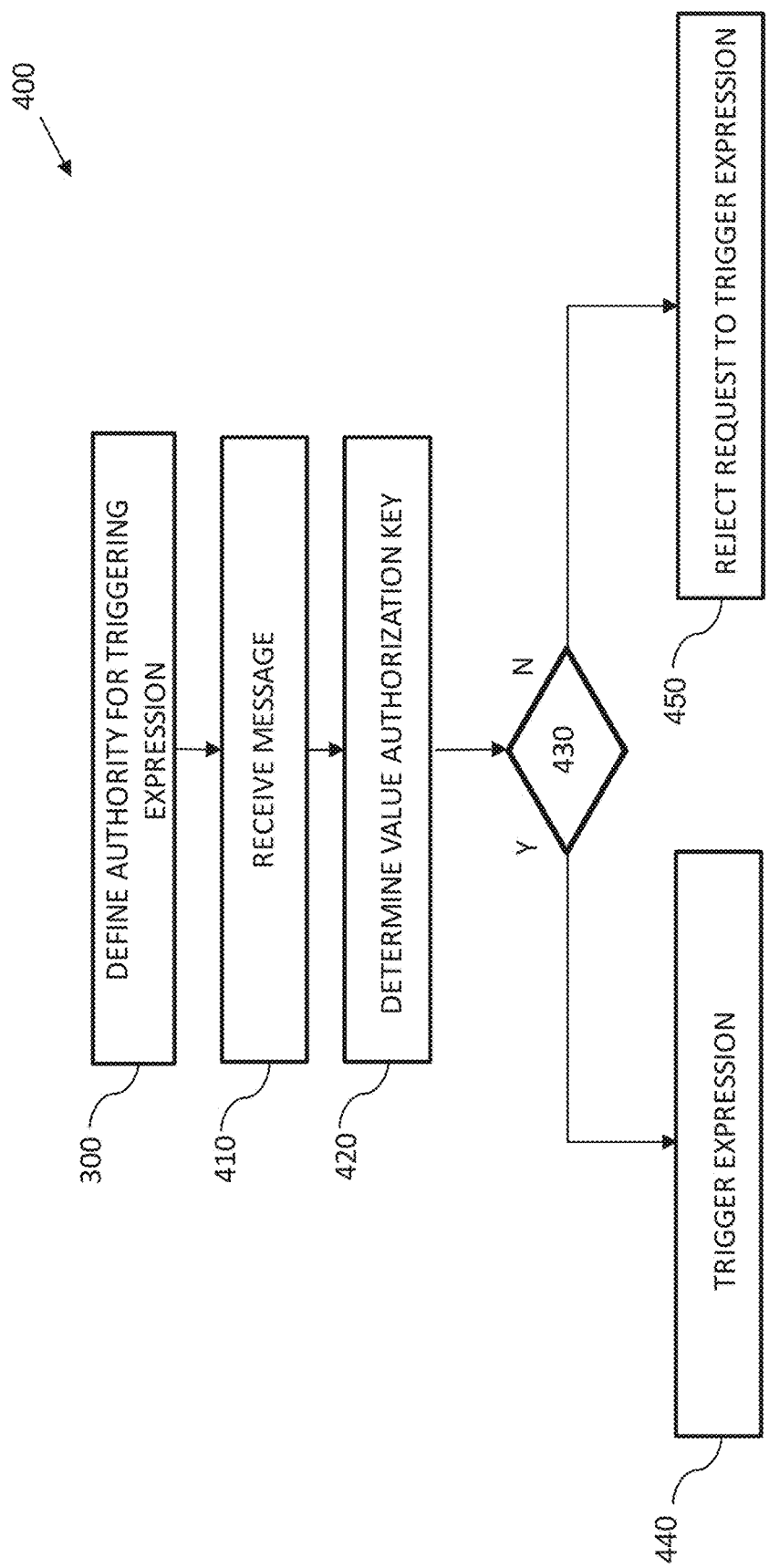

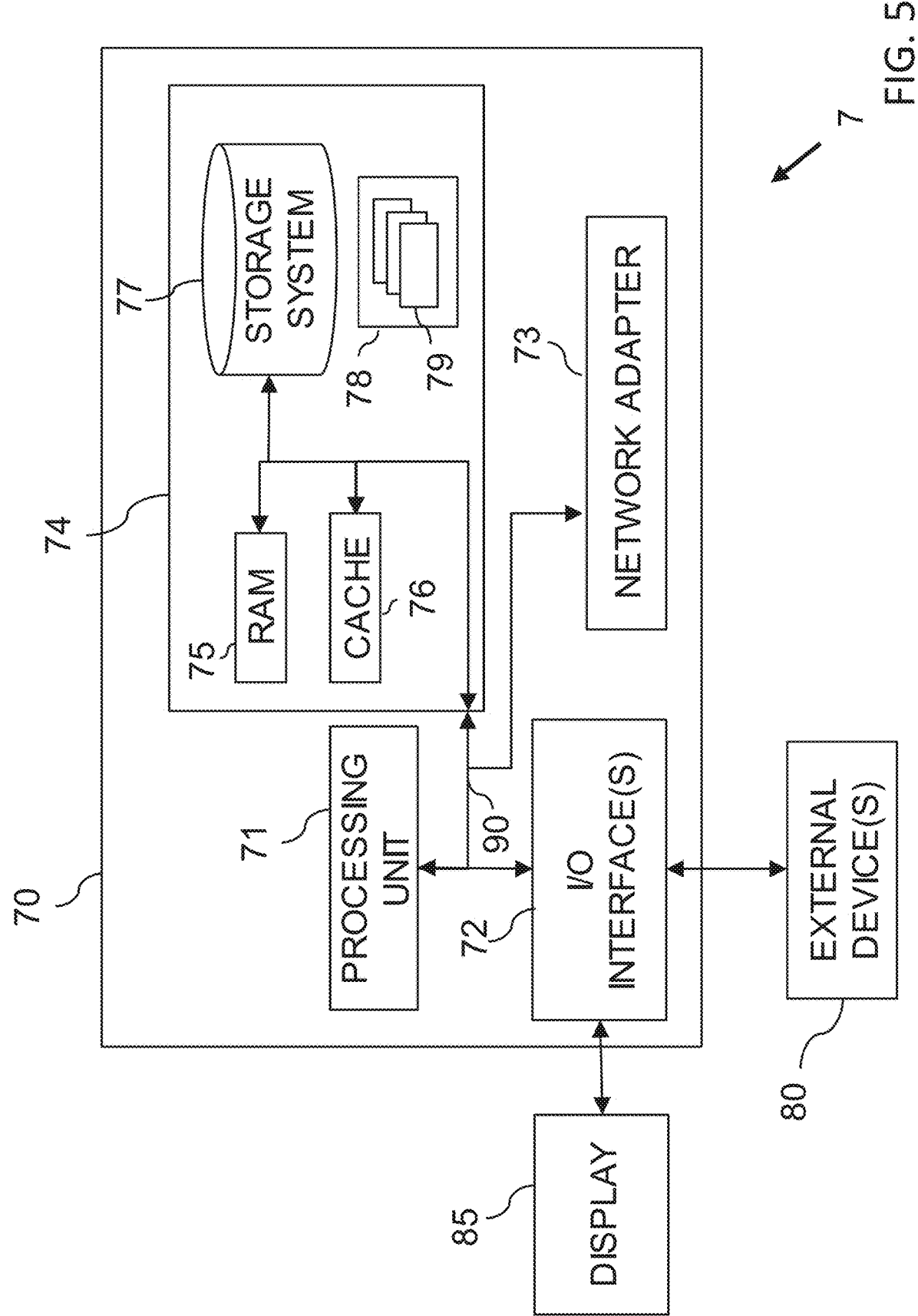

ENTERPRISE WORKSPACES

BACKGROUND

The present invention relates generally to the field of enterprise workspaces, and more particularly to a method for defining authority for triggering an expression within an enterprise workspace from an external service outside the enterprise workspace.

The present invention also relates to a method for triggering a message in an enterprise workspace.

The present invention also relates to a computer program product comprising computer-readable program code that enables a processor of a system, or a number of processors of a network, to implement such methods.

The present invention also relates to a system for triggering an expression within an enterprise workspace.

It is known to provide an enterprise workspace in computing devices/networks, so that an operating system can separate components and data in the enterprise workspace from components and data in a personal workspace. In addition, components can monitor, control, and restrict activity in the enterprise workspace without having to monitor, control, or restrict activity in the personal workspace. For such reasons, enterprise workspaces are commonly provided by companies for use by employees. For example, an employee can use his/her personal computing device to access an enterprise workspace provided by his/her employer and undertake work activities, whilst the enterprise workspace monitors, controls, and/or restricts activity in the enterprise workspace (so as to maintain security for example).

An enterprise workspace will typically require a user to create a user account with the distributor of the enterprise workspace. In this way, a user will typically have an enterprise workspace account associating the user with the enterprise workspace. The enterprise workspace account may, for example, be used to configure the enterprise workspace for the associated user.

Network service platforms are designed for allowing people to access and/or share information through the internet. Nowadays, many network service platforms that provide services (e.g. applications and programs) have been very well developed. However, conventional services of network service platforms typically require a user to firstly complete a registration process before logging into the network service. After the registration process is completed, the user will have an associated service user account that he/she uses to log into the service (e.g. to acquire or use the services and functions provided by service platforms).

Enterprise workspace applications which intercept activity within a workspace are known, and such applications typically use a well-known webhook mechanism. Such webhook mechanisms are well-known with network service platforms, and thus enable an enterprise workspace application to work with a service of a network service platform.

Messages arrive via the webhook from a multitude of spaces and a multitude of users. An enterprise workspace application acts upon messages via user-defined triggers and functions (provided in the form of expressions). By way of example, trigger may be defined within a space as follows:

=function help( ) "You requested help"
=trigger helptrigger contains(message, "help")!!! say ("Hello", help( ))

Any message expressed into the space that has the above trigger containing the word "help" would then meet the trigger condition "contains(message, "help")" and thus activate the trigger function (in this case simply displaying the message "Hello You requested help").

While triggering functions directly from within an enterprise workspace in response to a message is convenient, it is desirable to trigger functions within a workspace in response to some external event. For example, a running program that encounters an error may wish to trigger a function within a specific workspace causing alerts or other activity.

A drawback of this is that malicious users and/or programs may trigger functions that cause unwanted, undesirable or unexpected activity.

SUMMARY

The present invention seeks to provide a computer-implemented method for defining authority for triggering an expression within an enterprise workspace from an external service outside the enterprise workspace.

The present invention also seeks to provide a computer-implemented method for triggering a message in an enterprise workspace.

The present invention further seeks to provide a computer-implemented method for triggering an expression within an enterprise workspace, the enterprise workspace having an associated secret and rolling key function that has been securely shared with a service. The method comprises defining a rolling key function configured to generate a rolling key. The method also comprises defining a secret as a starting point for the rolling key function. The secret and the rolling key function is securely shared with the external service.

According to another aspect of the invention, there is provided a computer-implemented method for triggering a message in an enterprise workspace. The method comprise defining authority for triggering an expression within an enterprise workspace from an external service outside the enterprise workspace according to a proposed embodiment. The method also comprises receiving a message from a service, the message comprising an authorization key and an expression to be triggered. The method further comprises determining if triggering of the expression is authorized based on the secret and the authorization key.

The present invention also provides a computer-implemented method for triggering an expression within an enterprise workspace, the enterprise workspace having an associated secret and rolling key function that has been securely shared with a service. The method comprises receiving a message from a service, the message comprising an authorization key and an expression to be triggered. The method also comprises determining if triggering of the expression is authorized based on the secret and the authorization key.

The present invention further seeks to provide a computer program product including computer program code for implementing a proposed method when executed by a processing unit.

The present invention also seeks to provide a processing system adapted to execute this computer program code.

According to another aspect of the invention, there is provided a computer system comprising at least one processor and the computer program product according to an embodiment. The at least one processor is adapted to execute the computer program code of said computer program product.

The present invention also seeks to provide a system for triggering an expression within an enterprise workspace, the enterprise workspace having an associated secret and rolling key function that has been securely shared with a service.

The system comprises an interface configured to receive a message from a service, the message comprising an authorization key and an expression to be triggered. The system also comprises an authentication component configured to determine if triggering of the expression is authorized based on the secret and the authorization key.

BRIEF DESCRIPTION OF THE DRAWINGS

Preferred embodiments of the present invention will now be described, by way of example only, with reference to the following drawings, in which:

FIG. 4 is a simplified flow diagram of an exemplary embodiment of a computer-implemented method a computer-implemented method for triggering an expression in an enterprise workspace;

FIG. 5 illustrates a system according to another embodiment.

DETAILED DESCRIPTION

Figure 1:
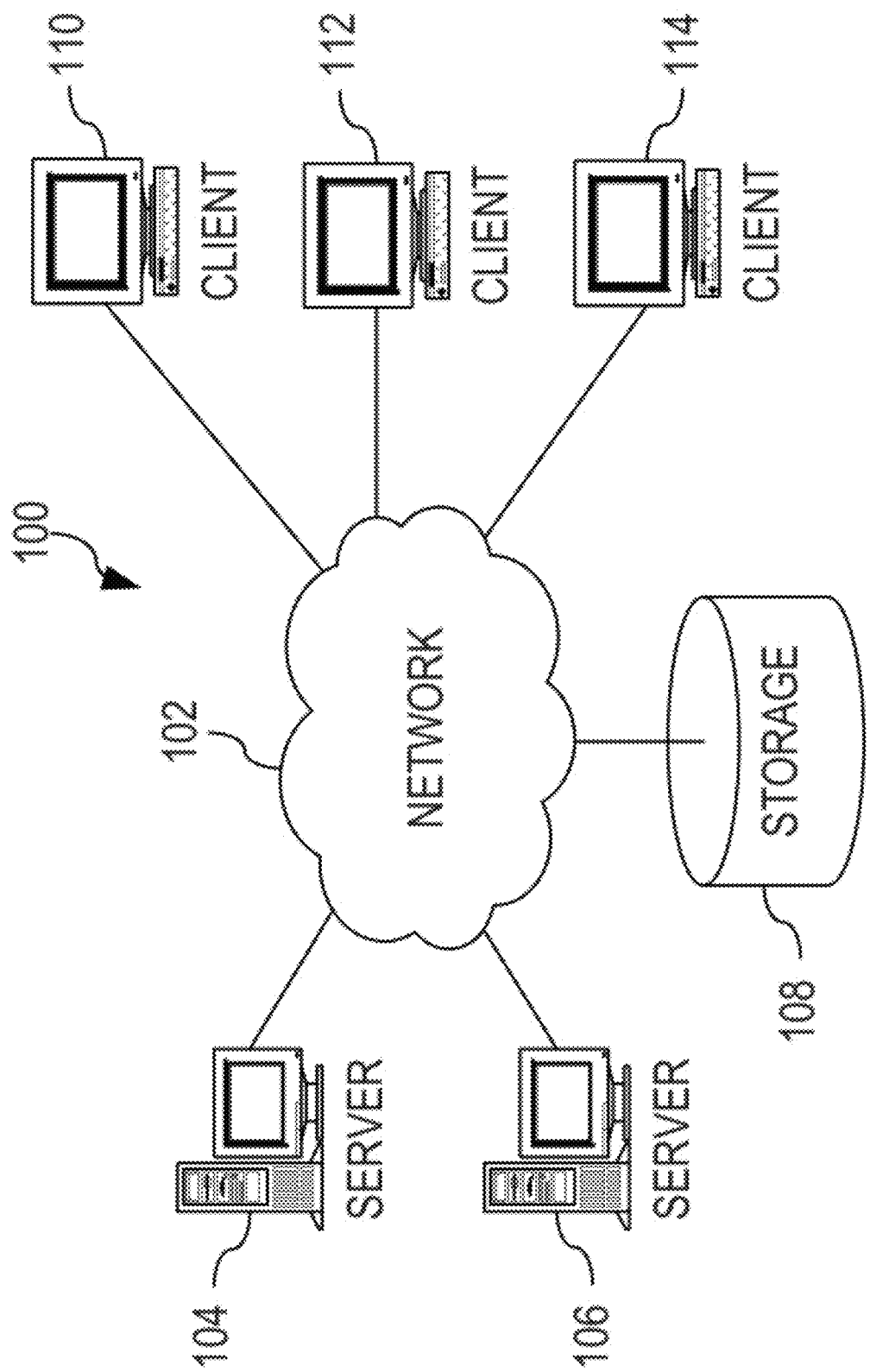
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed are concepts for protecting against malicious and/or unauthorized programs, applications and/or malicious users triggering an expression within an enterprise workspace from an external service outside the enterprise workspace that may cause unwanted, undesirable or unexpected activity.

Such concepts define an authority for triggering an expression. In particular, a secret and rolling key function may be defined and securely shared with an external service. The securely-shared information may be used to determine whether triggering of an expression is authorised, permitted or otherwise trusted. In this way, a user-defined secret generation algorithm may be applied at a workspace scope or for a specific user.

Proposed embodiments may thus provide a method and/or system for defining authority for triggering an expression within an enterprise workspace from an external service outside the enterprise workspace. Proposed embodiments may also provide a method and/or system for triggering an expression from an external service. Accordingly, such external triggering of an expression may be implemented in a secure, trusted and flexible manner.

Embodiments may therefore provide a tool for secure triggering of an expression of an enterprise workspace application from an external service, thus enabling the expression to be triggered by a remote service.

For the avoidance of doubt, reference to an enterprise workspace is to be taken to refer to a workspace provided (by a distributor, controller, organization, etc.) in computing devices/networks which may have components and data that are separated from components and data of another (e.g. personal) workspace. Enterprise workspaces are commonly provided by companies for use by employees so that the employees can use their personal computing device(s) to access the enterprise workspace and undertake work activities. An example of such a workspace may, for instance, comprise a Slack™ channel accessed via a Slack™ client.

Also, reference to service is to be taken to refer to a service provided by a service network platform and accessible via the Internet. A service network platform may, for example, be provided by an external, third party that is independent or different from the provider of the enterprise workspace. Services are commonly designed and provided so as to enable users to access and/or share information through the internet, and they typically require a user to register with the service so as to establish a service user account (having an associated identity) with one more corresponding service configurations and authorizations. An exemplary service may, for instance, provide an email service provider by a third party organization. Another example may be a Google® Application Programming Interface which may for example be used to enable a user to send email directly from a workspace.

Further, reference to an expression is to be taken to refer to a string of alphanumeric characters used to define a function for processing by an enterprise workspace application. Such a function may comprise one or more messages obtained via a webhook function for example.

Embodiments may associate the secret with a user (or owner). The user may be provided with the unique identifier of a first user account of the enterprise workspace, the first user account having an associated service authorization configured to authorize the enterprise workspace application to access a service using the user account. In this way, the secret may be used to control whether triggering of the expression (or a part of the expression, i.e. subexpression) employs the service authorization (i.e. the authorizations of the first user account).

Although in some embodiments, the service authorization (allowing access to data of the service for the first user account) may have already been established (e.g. via a previously undertaken authorization process), some embodiments may further comprise the step of establishing a service authorization for the first user account. Accordingly, some embodiments may be configured to facilitate both a service authorization process and a process of controlling use of the service authorization when triggering an expression.

By way of example, establishing a service authorization for the first user account may comprise: defining an oauth profile for the first user account; and, based on the oauth profile, defining a service authorization that is configured to authorize the enterprise workspace to access the service using the first user account. In this way, embodiments may support known authorization concepts and procedures, thus facilitating usage with existing/conventional services and service network platforms.

Some embodiments may further comprise associating the secret with the enterprise workspace. The enterprise workspace may, for example, be defined based on an indication (e.g. input signal) provided by the owner, and the enterprise workspace may comprise a workspace identifier associated with a default workspace account.

Embodiments may also provide a method for triggering a message in an enterprise workspace. Such a method may comprise defining authority for triggering an expression within an enterprise workspace from an external service outside the enterprise workspace according to a proposed embodiment (e.g. as described above). Subsequently, a message may be received from a service, the message comprising an authorization key and an expression to be triggered. Based on the secret and the authorization key, it may be determined if triggering of the expression is authorized.

By way of example, the message may further comprise an identifier of a user of the enterprise workspace. Determining if triggering of the expression is authorized may then be further based on the identifier of a user of the enterprise workspace. This may prevent another (e.g. unauthorized) user from triggering the expression.

Proposed concepts may thus provide a method for triggering an expression within an enterprise workspace, the enterprise workspace having an associated secret and rolling key function that has been securely shared with a service, wherein the method comprises: receiving a message from a service, the message comprising an authorization key and an expression to be triggered; and determining if triggering of the expression is authorized based on the secret and the authorization key.

For example, determining if triggering of the expression is authorized may comprise: comparing the secret and the authorization key; and determining if processing of the expression is authorized based on the result of the comparison. The shared secret may therefore be used to determine if an expression is triggered. For instance, embodiments may be configured so that the authorization key provided must match the secret in order for the expression to be triggered.

By way of example, in embodiments, the service may comprise a service of a network service platform accessible via the Internet. The service may therefore comprise a third party service (such as an email service) that is external to the provider/distributor of the enterprise workspace. Embodiments may therefore control the ability of an external service to trigger an expression. For instance, embodiments may prevent an expression being triggered and/or being triggered as if by a particular user or service even though it wasn't.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
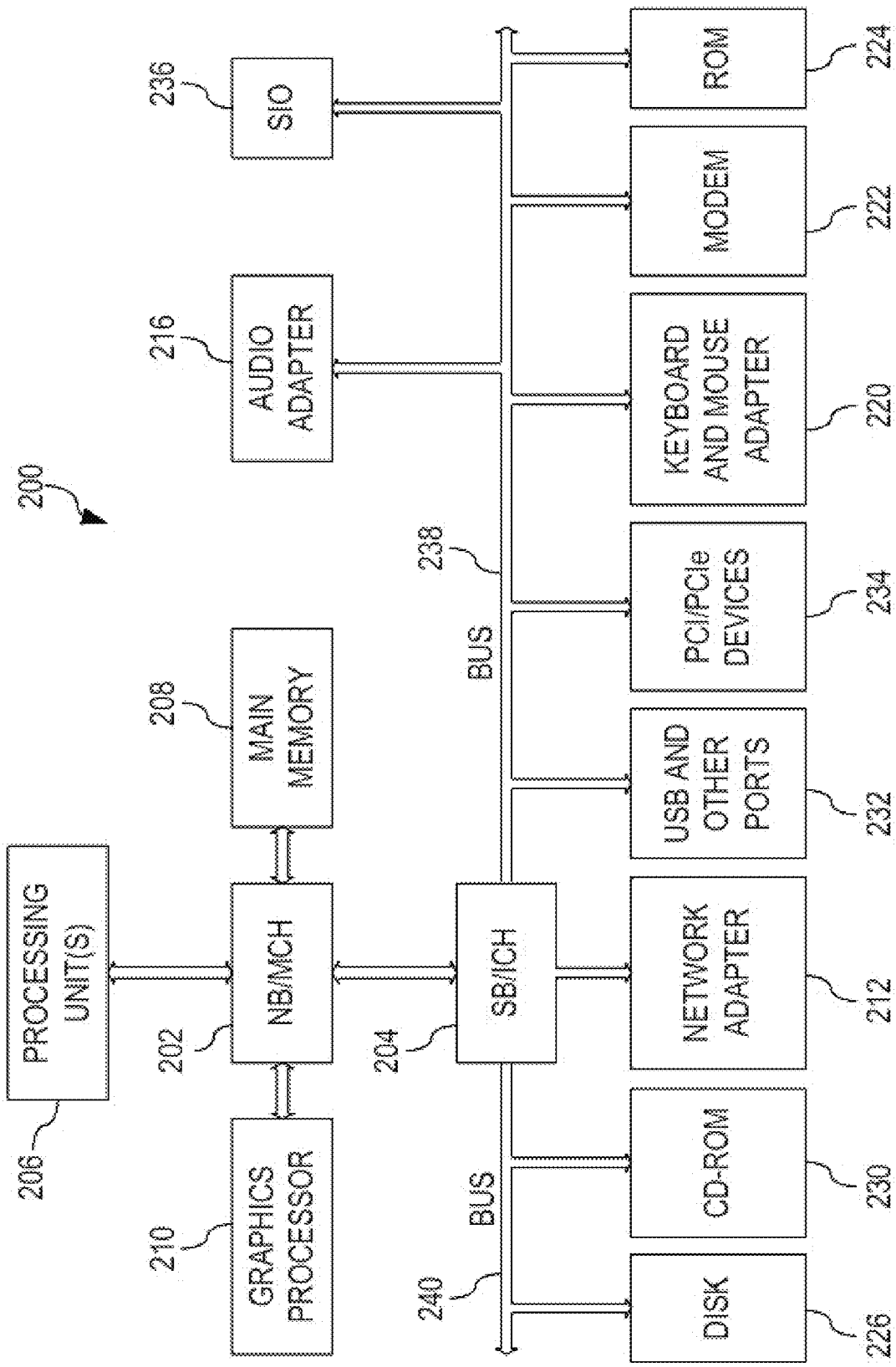
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed. IBM, eServer and AIX are trademarks of International Business Machines Corporation in the United States and/or other countries. Linux is a registered trademark of Linus Torvalds in the United States, other countries, or both.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments provide a method and system for defining authority of an external service to trigger an expression within an enterprise workspace. Such embodiments may employ a rolling key function to generate a key that can then be used to authorize the triggering of an expression. By securely sharing the rolling key function, and agreeing a starting point (e.g. starting value, initial input value, etc.) for the rolling key function, a concept of using a key value to check the authority of a service to trigger an expression can be employed. In this way, an expected key value may be determined and then used to check if an authorization key provided by an external service meets the expected value.

Figure 3:
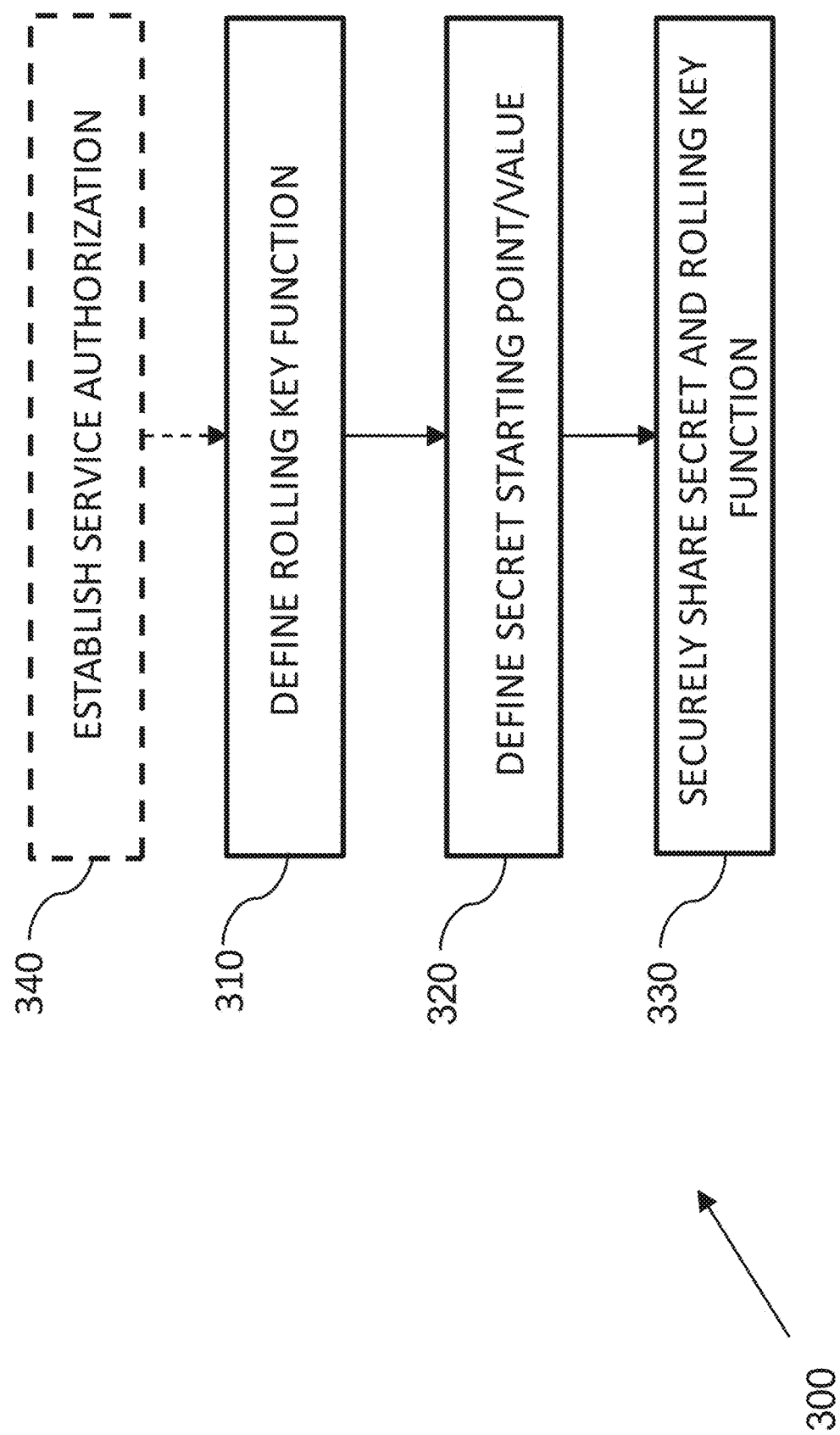
FIG. 3 is a simplified flow diagram of an exemplary embodiment of a computer-implemented method for defining authority for triggering an expression within an enterprise workspace.

Referring now to FIG. 3, an exemplary embodiment of a method 300 for defining authority for triggering an expression within an enterprise workspace from an external service will be described. In this example, the external service is a service of a network service platform accessible via the Internet, and the enterprise workspace is a workspace provided/distributed by a company to its employees.

Step 310 comprises defining a rolling key function configured to generate a rolling key. Here, the rolling key function comprises a rolling code algorithm. More specifically, in this example, the rolling code algorithm is configured to generate a sequence of numbers that will eventually repeat depending on the values of two input variables. For example, the rolling code algorithm is a known/conventional random number generator.

In step 320, a starting point for the rolling key function is defined as a secret. Here, the starting point is defined by defining the starting/initial value for each of the two input variables.

In step 330, the secret starting point and rolling key function are securely shared with the external service (e.g. via a secure communications channel/session).

It will be appreciated that the completion of the method 300 for defining authority for triggering an expression provides a shared secret. This shared secret can be used (i.e. assessed) to determine if a request to trigger an expression is authorised (i.e. trusted, permitted, etc.).

Although in the above example embodiment a service authorization will have been previously established for a first user account, it is to be understood that other embodiments may comprise the preceding step (340) of establishing a service authorization for the first user account, the service authorization being configured to authorize the enterprise workspace to access data of the service for the first user account. Simply by way of illustration, this step is depicted in FIG. 3 using dashed lines.

For example, the step 340 of establishing a service authorization for the first user account may comprise: defining an 'oauth profile' for the first user account; and based on the oauth profile, defining a service authorization that is configured to authorize the enterprise workspace to access data of the service for the first user account. Oath profiles are widely known and used in conventional authorization concepts and procedures. Accordingly, detailed description of such oauth profiles and their usage is omitted herein.

Referring now to FIG. 4, an exemplary embodiment of a method 400 of for triggering an expression in an enterprise workspace will be described.

In this example, the expression is defined according to the embodiment of FIG. 3. Thus, the first step of the method 400 is to complete the method 300 defining authority for triggering an expression. As mentioned above, completion of the method 300 for defining the processing of an expression provides a shared secret, and this may then be used to control if and/or how an expression is triggered.

The method then proceeds to step 410 of receiving a message from a service, the message comprising an authorization key and an expression to be triggered. In this way, a message is received which comprises authorization information for the purpose of identifying authority of the message to trigger the expression.

In step 420, the value of the authorization key of the message is determined. In this example, the authorization key comprises a string of alphanumeric characters. Thus, in step 420, the value of each of the alphanumeric characters of the string is determined.

Step 430 is a decision step which, based on the value of the authorization key, controls whether the method proceeds to step 440 or to step 450.

If the determined value of the authorization key matches an expected value (determined using the secret and the rolling key function), step 430 controls the method to proceed to step 440. In step 440, the expression is triggered (e.g. in a conventional manner).

Conversely, if the determined value of the authorization key does not match the expected value, step 430 controls the method to proceed to step 450. Step 450 comprises preventing or rejecting the triggering of the expression.

This ensures that the expression is only triggered if the value of the authorization key matches the expected value (namely a value that is expected if the correct rolling key function and secret starting value is employed), thus preventing unauthorized triggering of an expression.

To aid further understanding and appreciation of the proposed concept(s), an exemplary implementations will now be described. Such implementations are simply provided to demonstrate process steps and algorithms that may be employed, and it should be understood that other implementations are not limited to such process steps and algorithms only. Indeed, the skilled person will appreciate the other process steps and/algorithms may be employed to undertake and/or provide similar aspects of the proposed concept(s).

We begin description of an exemplary implementation that enables a user-defined secret generation algorithm to be applied at a workspace or for a specific user. Such embodiments may provide a user with direct control of how secrets are created and how and when they update.

A call from an external service into an enterprise workspace may be provided in the form of a URL, as illustrated by the following example: <WorkpsaceDomain>/execute?key=<secret>&spaceId=<spaceId>&userId=<userId>&expression=<expression>

In the above example: 'key' is the secret; 'spaceId' is the identifier for the workspace in which the expression is to execute; 'userId' is the identifier of the user under which this expression should be executed; 'expression' is the expression "formula" to be run It will therefore be appreciated that the "key" is a secret or an algorithm for generating a secret which can be negotiated between the caller and the workspace owner or user.

According to proposed embodiments, the owner or user of a workspace may easily define a secret and have it checked on message receipt. The secret may be changed on a regular basis.

With the capability of an expression language within the chat space, a secret generation algorithm can be agreed between the parties. For example: an agreed value may be "SECRET123456". Today's date may then be appended, resulting in the modified value "SECRET123456_17_07_18". A sha256 hash value of the modified value may then be generated so as to provide the following final value: "690903f465e308ba7f9499b23c06ed1cfe03fc76328ee609399e68f709f60ae8"

A predefined function name can be known to the external service, for instance "generate_secret( )". Each external service may then define its own 'generate_secret' method for example: =function generate_secret( ) hash("SECRET123456"+substring(datetime,0,10))

The workspace asks the service for the secret, which then gives the result of generate_secret( ) and that is compared to a parameter passed by the message from the service. If the secrets don't match the message is declined.

For user level secret generation, a user can define a private generate_secret( ) function, for example: =function my_generate_secret( ) hash("mysecret"+substring(datetime,0,10))

A private function is a function defined by a specific user and configured to only run under that user's identity.

In another example, a shared secret value can be provided as an input to an algorithm that can be used to generate keys unique to each request made to the service. The key can then be verified by the receiver using a generate_secret method. By way of example, the following function may be defined:
=function generator(p)
m:=712345;
a:=3491;
q:=m/a;
r:=m % a;
p2: =(a*(p % q))–(r*integer(p/q));
if(p2<0, "p2+m", "p2");

The above function is a conventional random number generator having an output is dependent on the two variables 'm' and 'a'. An exemplary generate_secret function may then be defined as follows:
=function generate_secret(key)
if(var('pze')=0, "set('pze', 14235)", "0");
test:=generator(number(var('pze')));
if(key=test, "pze:=key; key", 'say("Bad key received"+key); "0"')

By sharing, as secrets, 'm' and 'a' and a start value (in this example 14235) and the generator algorithm, a sender and receiver can keep in sync where every time a successful request with a valid key is made the generator is primed ready to create a next key.

For example, a sender may have the following function defined:

```
function generator(p)
{
    var m = 712345;
    var a = 3491;
    var q = m / a;
    var r = m % a;
    var p2 = ( a * (p % q)) – (r * Math.floor(p / q));
    return p2<0 ? p2+m : p2;
}
``` var next=GM_getValue("rollingcode",14235); // default 14235 if rollingcode is not set
var key=generator(next); // generate the key
// If request successful
GM_setValue("rollingcode", key); // prime for next iteration The above approach is based on the concept that both the sender and the receiver (workspace) run the same generator function primed with the same two secret variables (m=712345 and a=3491) and the same rolling code starting value (14235 in the above example). Each time the generator function is run, it sets rollingcode to a new value.

The sender runs the generator, sends request stating the now rollingcode value. The receiver runs the algorithm and makes sure his rollingcode value matches the rolling code specified in the request. If a match it's good to process the request, if not reject the request. The sender and receiver can keep in sync where every time a successful request with a valid key is made the generator is primed ready to create the next key. This ensures every request sent has a unique key that is protected against replay.

The above approach thus employs a rolling code algorithm that generates a sequence of numbers that will eventually repeat depending on the values of 'm' and 'a'.

Proposed embodiments therefore employ a rolling code at the workspace receiver side, and this can be associated with a user or a workspace.

The owner of the external service is communicated the secret generation method, and then implements an equivalent on their side in order to generate a matching secret. This allows the URL to be constructed to allow for expression evaluation targeted at the specific space and for a specific user.

The advantage of such an approach is that each workspace and/or user within the workspace may define its own secret generation algorithm and agree that with a message sender. In this way, a workspace owner and/or an individual user can control the method employed for generation and sharing of the secret.

In the first example above, the message sender (e.g. external service) must know the secret "SECRET123456", must know the algorithm (append date and hash to a sha256 Digest) if sending a message to execute under the guise of a specific user. Put another way, the sender must know that user's specific secret. In the example, the secret changes every day due to the date component in the algorithm, thus providing some protection from secrets gleaned from network logs for example. To provide further protection, it may be preferable to also employ secure transport layer connections between the sender and receiver.

Further, in the latter example above, message sender is required to know the 'generate' algorithm and must also know the values for 'm', 'a' and the start point. None of these secrets are sent over the request.

It will be appreciated that various conventional or known approaches to securely sharing secrets may be employed by embodiments. For instance, secrets may be exchanged on out-of-band channels and/or using known secret key exchange algorithms (like Diffie-Hellman approaches for example). Secure sharing of secrets is therefore with the common knowledge and capabilities of a reader, and detailed description of how the secret(s) may be shared is therefore omitted.

Proposed concepts thus provided an authentication concept that facilitates the secure triggering of workspace expressions by external services.

Embodiments may comprise a computer system 70, which may form part of a networked system 7 illustrated in FIG. 5. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein. #

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for defining authority for triggering an expression within an enterprise workspace from an external service outside the enterprise workspace, the method comprising:
   defining a rolling key function configured to generate a rolling key;
   defining a secret as a starting point for the rolling key function;
   securely sharing the secret and the rolling key function with the external service;
   receiving a message from a service, the message comprising an authorization key and an expression to be triggered; and
   determining if triggering of the expression is authorized based on the secret and the authorization key.

2. The method of claim 1, wherein the rolling key function comprises a rolling code algorithm.

3. The method of claim 1, further comprising:
   associating the secret with a user of the enterprise workspace,
   and wherein the user is associated with a first user account of the enterprise workspace, the first user account having an associated service authorization configured to authorize the enterprise workspace to access the service using the first user account.

4. The method of claim 3, further comprising:
   establishing a service authorization for the first user account.

5. The method of claim 4, wherein establishing a service authorization for the first user account comprises:
   defining an oauth profile for the first user account; and
   based on the oauth profile, defining a service authorization that is configured to authorize the enterprise workspace to access the service using the first user account.

6. The method of claim 3, wherein associating the secret comprises associating the shared secret with the enterprise workspace, and wherein the enterprise workspace comprises a workspace identifier and is associated with a default workspace account, the default workspace account having an associated service authorization configured to authorize the enterprise workspace to access the service using the default workspace account.

7. The method of claim 1, wherein the service comprises a service of a network service platform accessible via the Internet.

8. The method of claim 1, wherein the message further comprises an identifier of a user of the enterprise workspace,
   and wherein determining if triggering of the expression is authorized is further based on the identifier of a user of the enterprise workspace.

9. The method of claim 8, wherein the user is associated with the first user account of the enterprise workspace, the first user account having an associated service authorization configured to authorize the enterprise workspace to access the service using the first user account,
   and further comprising:
   responsive to determining triggering of the expression is authorized, triggering the expression in the enterprise workspace using the service authorization associated with the first user account.

10. The method of claim 1, wherein determining if triggering of the expression is authorized comprises:
    comparing the secret and the authorization key; and
    determining if triggering of the expression is authorized based on the result of the comparison.

11. The method of claim 1, wherein determining if processing of the expression is authorized comprises:
    generating a key based on the secret value;
    comparing the generated key and the authorization key; and
    determining if triggering of the expression is authorized based on the result of the comparison.

* * * * *